United States Patent
Patel et al.

(10) Patent No.: US 10,038,645 B2
(45) Date of Patent: Jul. 31, 2018

(54) SYSTEM AND METHOD FOR PORTABLE PARTITIONS IN A MULTITENANT APPLICATION SERVER ENVIRONMENT

(71) Applicant: ORACLE INTERNATIONAL CORPORATION, Redwood Shores, CA (US)

(72) Inventors: Chanda Patel, Milpitas, CA (US);
Joseph Dipol, Sunnyvale, CA (US);
Trilok Agarwal, Santa Clara, CA (US);
Nazrul Islam, Santa Clara, CA (US);
Rajiv Mordani, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 345 days.

(21) Appl. No.: 14/748,102

(22) Filed: Jun. 23, 2015

(65) Prior Publication Data
US 2015/0372941 A1    Dec. 24, 2015

Related U.S. Application Data

(60) Provisional application No. 62/016,032, filed on Jun. 23, 2014, provisional application No. 62/054,906, filed on Sep. 24, 2014.

(51) Int. Cl.
*G06F 15/173* (2006.01)
*H04L 12/911* (2013.01)
(Continued)

(52) U.S. Cl.
CPC ............ *H04L 47/78* (2013.01); *G06F 9/5077* (2013.01); *G06F 17/30584* (2013.01); *H04L 67/02* (2013.01); *H04L 67/10* (2013.01)

(58) Field of Classification Search
None
See application file for complete search history.

(56) References Cited

U.S. PATENT DOCUMENTS 5,838,916 A * 11/1998 Domenikos ............. G06F 9/445
709/217
2011/0022694 A1    1/2011 Dalal
(Continued)

OTHER PUBLICATIONS

International Searching Authority at the European Patent Office, International Search Report and Written Opinion for PCT International Patent Application No. PCT/US2015/037262, dated Oct. 15, 2015, 13 pages.

*Primary Examiner* — Phyllis A Book
(74) *Attorney, Agent, or Firm* — Tucker Ellis LLP (57) ABSTRACT

In accordance with an embodiment, described herein is a system and method for providing portable partitions in a multitenant application server environment. In accordance with an embodiment, the system enables a partition to be exported from first or source domain (e.g., a test domain), and imported into another second or target domain (e.g., a production domain). During creation or export of a partition archive, the partition archive is created which includes a partition configuration, resource group or resource group template information, and optionally application binaries. The partition archive can also include an interface that allows access to exportable or configurable values associated with the partition. During deployment or import of the partition archive to the target domain, the information in the partition archive, including the exportable or configurable values associated with the partition, are used to configure the partition for use in the target domain.

20 Claims, 8 Drawing Sheets

(51) Int. Cl.
 *H04L 29/08* (2006.01)
 *G06F 17/30* (2006.01)
 *G06F 9/50* (2006.01)

(56) References Cited

U.S. PATENT DOCUMENTS

| | | | |
|---|---|---|---|
| 2012/0147894 A1 | 6/2012 | Mulligan | |
| 2012/0254445 A1 | 10/2012 | Kawamoto | |
| 2013/0304788 A1* | 11/2013 | DeLuca | G06F 8/61 709/201 |
| 2013/0326506 A1* | 12/2013 | McGrath | G06F 9/45558 718/1 |
| 2014/0149983 A1* | 5/2014 | Bonilla | G06F 9/45558 718/1 |
| 2014/0280595 A1* | 9/2014 | Mani | H04L 12/1827 709/204 |
| 2015/0106521 A1* | 4/2015 | Cao | G06F 9/4416 709/226 |

* cited by examiner

SYSTEM AND METHOD FOR PORTABLE PARTITIONS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR PORTABLE PARTITIONS IN A MULTITENANT APPLICATION SERVER ENVIRONMENT", Application No. 62/016,032, filed Jun. 23, 2014; and U.S. Provisional Application titled "SYSTEM AND METHOD FOR PORTABLE PARTITIONS IN A MULTITENANT APPLICATION SERVER ENVIRONMENT", Application No. 62/054,906, filed Sep. 24, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for portable partitions in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for providing portable partitions in a multitenant application server environment. In accordance with an embodiment, the system enables a partition to be exported from first or source domain (e.g., a test domain), and imported into another second or target domain (e.g., a production domain). During creation or export of a partition archive, the partition archive is created which includes a partition configuration, resource group or resource group template information, and optionally application binaries. The partition archive can also include an interface that allows access to exportable or configurable values associated with the partition. During deployment or import of the partition archive to the target domain, the information in the partition archive, including the exportable or configurable values associated with the partition, are used to configure the partition for use in the target domain.

DETAILED DESCRIPTION

In accordance with an embodiment, described herein is a system and method for providing portable partitions in a multitenant application server environment. In accordance with an embodiment, the system enables a partition to be exported from first or source domain (e.g., a test domain), and imported into another second or target domain (e.g., a production domain). During creation or export of a partition archive, the partition archive is created which includes a partition configuration, resource group or resource group template information, and optionally application binaries. The partition archive can also include an interface that allows access to exportable or configurable values associated with the partition. During deployment or import of the partition archive to the target domain, the information in the partition archive, including the exportable or configurable values associated with the partition, are used to configure the partition for use in the target domain.

Application Server (e.g., Multi-Tenant, MT) Environment

Figure 1:
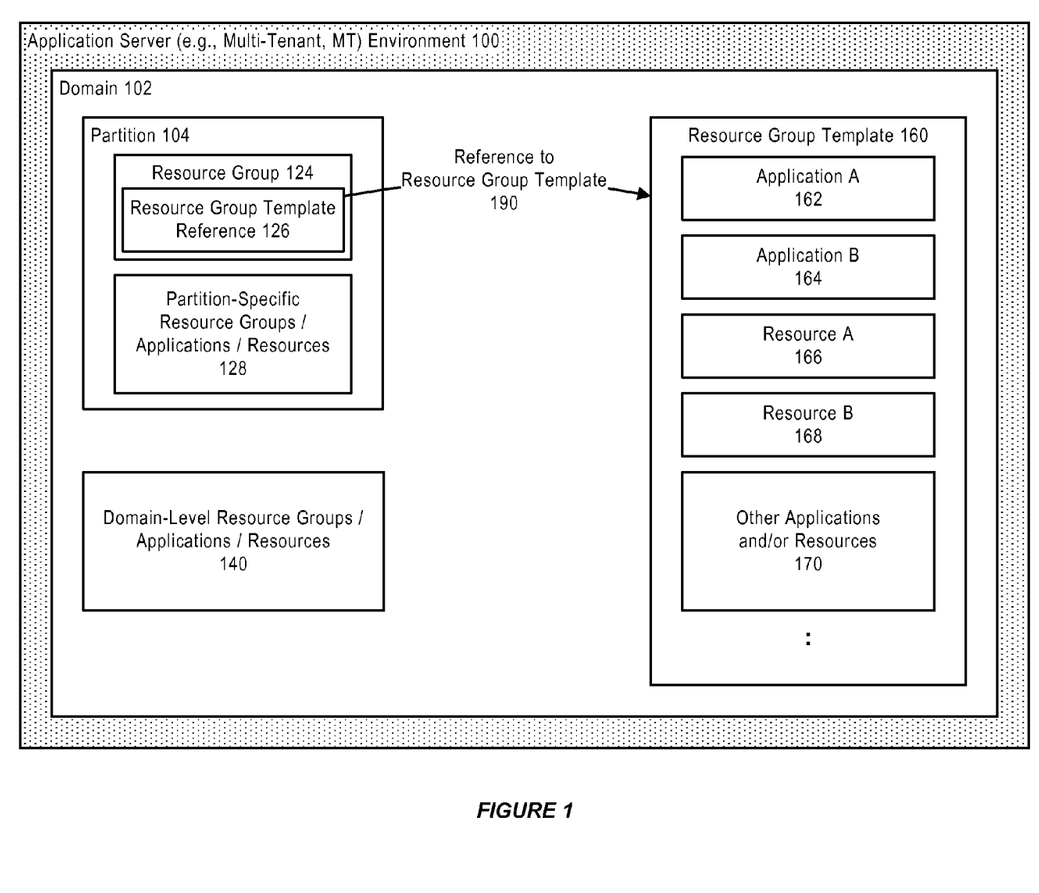
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
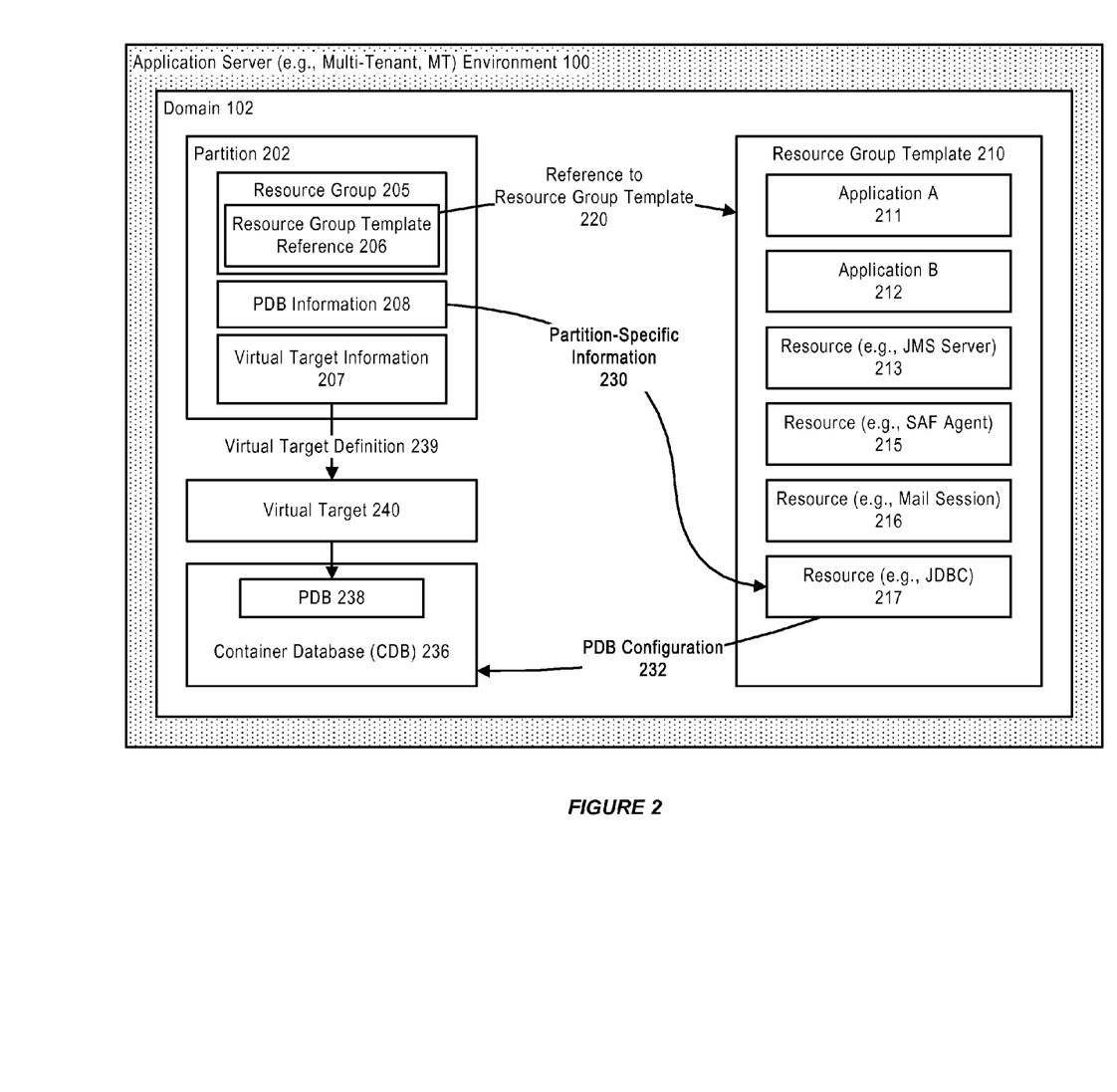
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
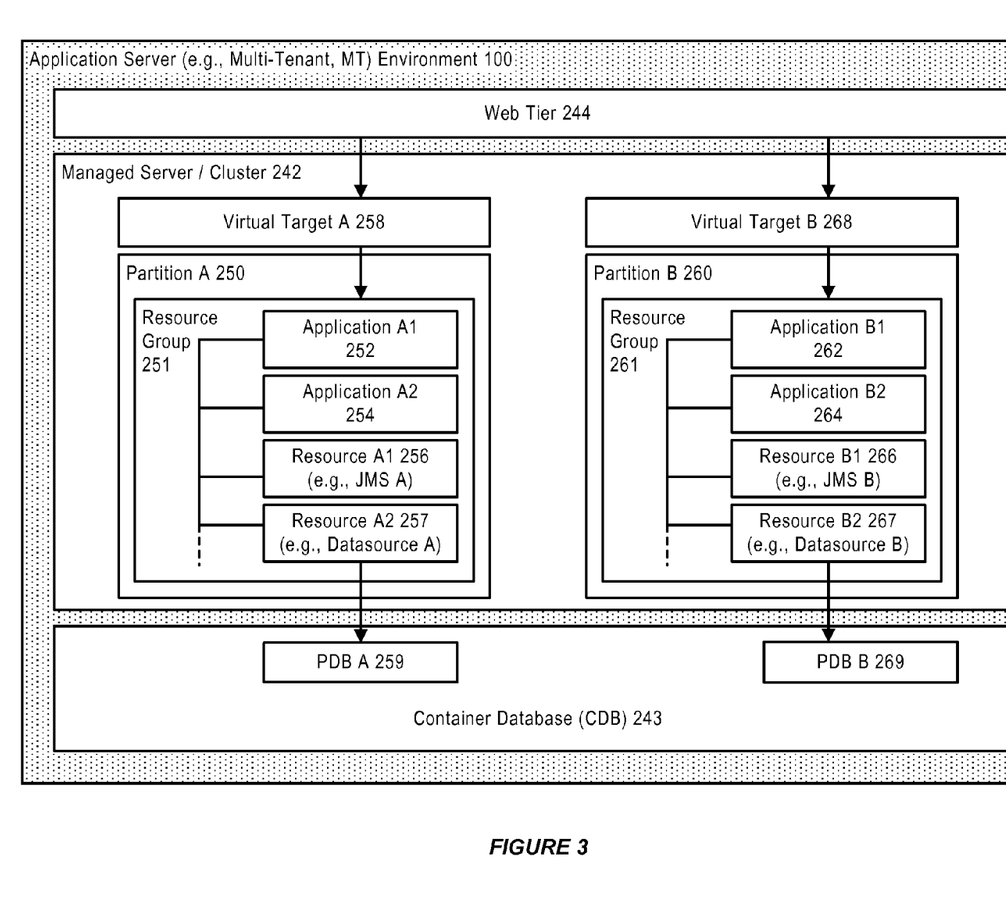
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
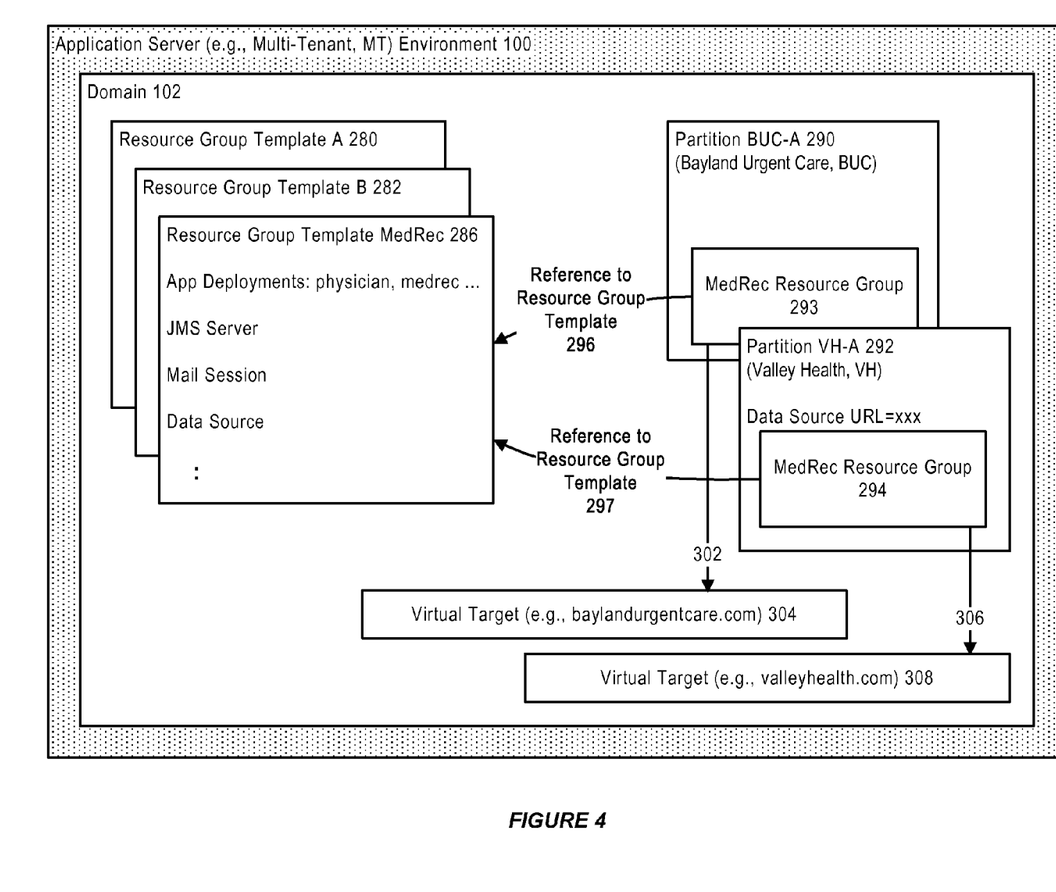
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
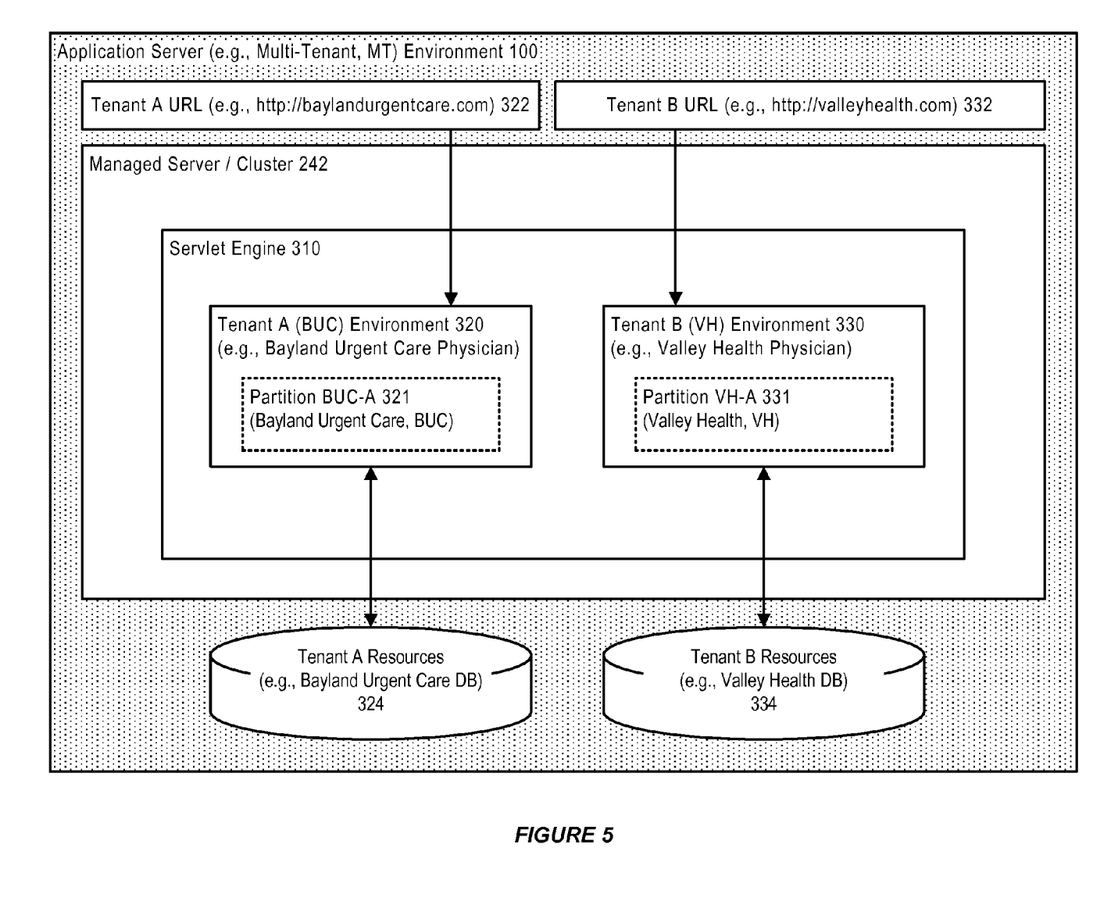
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Portable Partitions

In accordance with an embodiment, the system enables a partition to be exported from first or source domain (e.g., a test domain), and imported into another second or target domain (e.g., a production domain). During creation or export of a partition archive, the partition archive is created which includes a partition configuration, resource group or resource group template information, and optionally application binaries. The partition archive can also include an interface that allows access to exportable or configurable values associated with the partition. During deployment or import of the partition archive to the target domain, the information in the partition archive, including the exportable or configurable values associated with the partition, are used to configure the partition for use in the target domain.

In accordance with various embodiments, the feature is useful in such scenarios as an application server customer wishing to move partitions from, e.g., a test environment, where they have been successfully developed and tested, to a production environment.

Figure 6:
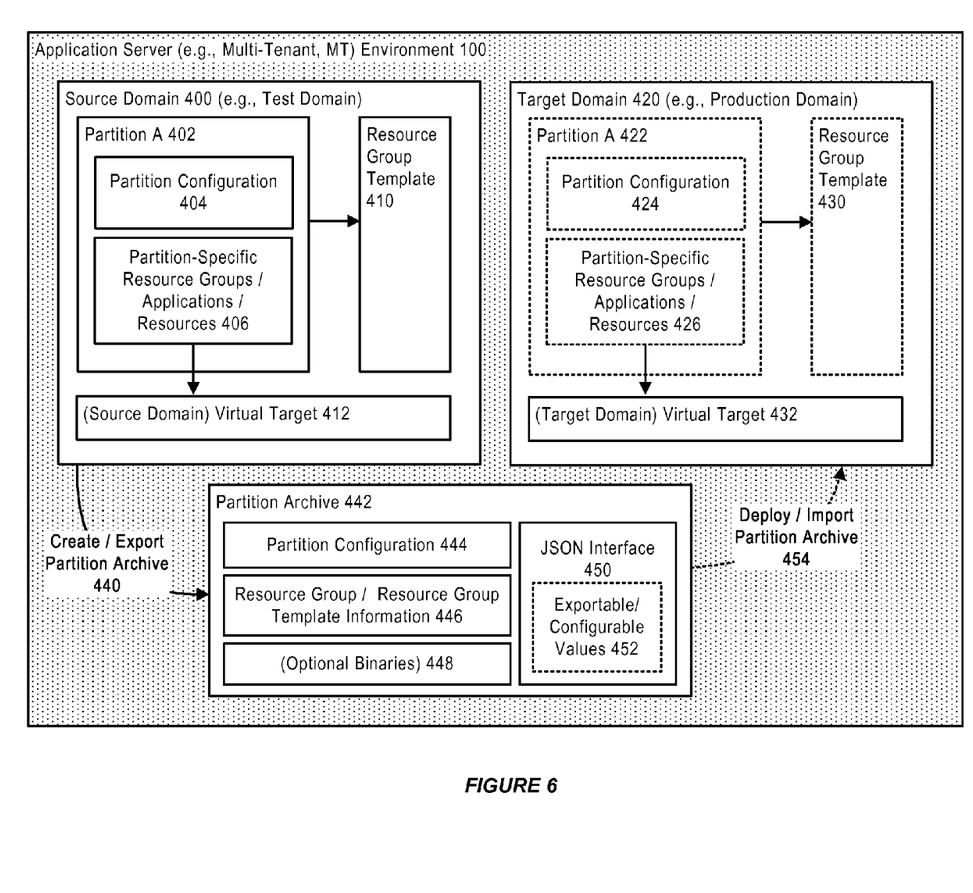
FIG. 6 illustrates the use of portable partitions in an application server, cloud, or other environment, in accordance with an embodiment.

FIG. 6 illustrates the use of portable partitions in an application server, cloud, or other environment, in accordance with an embodiment. As shown in FIG. 6, in accordance with an embodiment, a first or source domain 400 (e.g., a test domain) can include one or more partitions including a particular partition A 402, which is associated with a partition configuration 404 and one or more partition-specific resource groups, applications or resources 406.

Optionally, the partition can reference a resource group template 410. Each resource group, or the partition which includes that resource group, can be associated with a virtual target (e.g., virtual host) information that defines a target to which that resource group or partition should be targeted and deployed, such as virtual target 412 in the source domain.

In accordance with an embodiment, it may be desired to import the partition into another second or target domain 420 (e.g., a production domain), where the ported partition A 422 can be similarly associated with a partition configuration 424 and one or more partition-specific resource groups, applications or resources 426, optionally reference a resource group template 430, and be associated with a virtual target (e.g., virtual host) information that defines a target to which that resource group or partition should be targeted and deployed, such as virtual target 432 in the target domain.

In accordance with an embodiment, during creation or export 440 of a partition archive, the partition archive 442 is created which includes a partition configuration 444, resource group or resource group template information 446, and optionally application binaries 448. In accordance with an embodiment, the partition archive can be, e.g. a zip-type of file.

In accordance with an embodiment, the partition archive can also include a JSON interface 450 (e.g., a JSON file) that allows access to exportable or configurable values 452 associated with the partition. During deployment or import 454 of the partition archive to the target domain, the information in the partition archive, including the exportable or configurable values associated with the partition, are used to configure the partition for use in the target domain.

Since system configuration MBeans can change over time, the system can recognize annotations on system or partition attribute or MBeans, for example as an annotation @portable or @ExportCustomizableValue, which indicates that those MBeans should be exposed as exportable or configurable values associated with the partition.

In accordance with an embodiment, since application binaries can be heavyweight, it may be preferred to not bundle those binaries in the partition archive, so instead an export-partition command can be used to include or to exclude the binaries in the partition archive. The user in the target domain can then specify the location of the application binaries in the JSON file, which may be a different location from that of the source domain.

Figure 7:
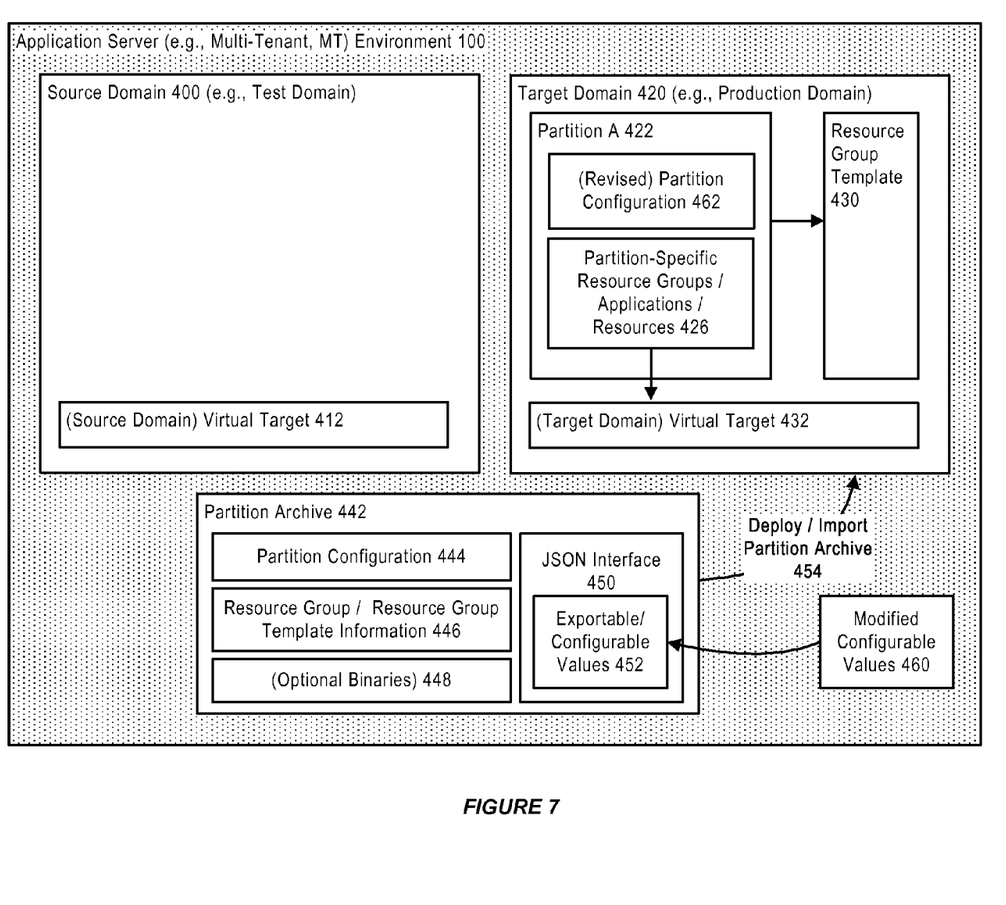
FIG. 7 further illustrates the use of portable partitions in an application server, cloud, or other environment, in accordance with an embodiment.

FIG. 7 further illustrates the use of portable partitions in an application server, cloud, or other environment, in accordance with an embodiment. As shown in FIG. 7, in accordance with an embodiment, and as described above, the partition archive includes a JSON interface that allows access to exportable or configurable values associated with the partition.

During deployment or import of the partition archive to the target domain, modified configurable values 460 can be received, either from an administrator or from another source, which modify or are otherwise used with the exportable or configurable values associated with the partition, and are used to provide a revised partition configuration 462, for use in the target domain.

Some partition configuration information may be restricted to a particular domain but a user should be able to modify it for use in a different domain. For example, a set of configuration MBeans under a domain, which are not user-modifiable, can be associated with a similar set of MBeans in a partition that are user-modifiable.

Based on any configuration changes provided by the administrator, the partition subcomponents can recreate their environment in the target domain. If a partition in the source domain includes a resource group with one application, then when that partition is imported into the target domain, the configuration and deployment of the application within that resource group can be performed automatically by the system, to suit the target domain.

For example, in accordance with an embodiment, the JSON file may expose attributes that allow a user to associate a different PDB with a partition in the target domain, compared to the source domain. During import, the system can check for a JSON file in the same folder as the partition archive, and, if it finds any changes by the user it uses those to override configuration defaults in the target domain.

Figure 8:
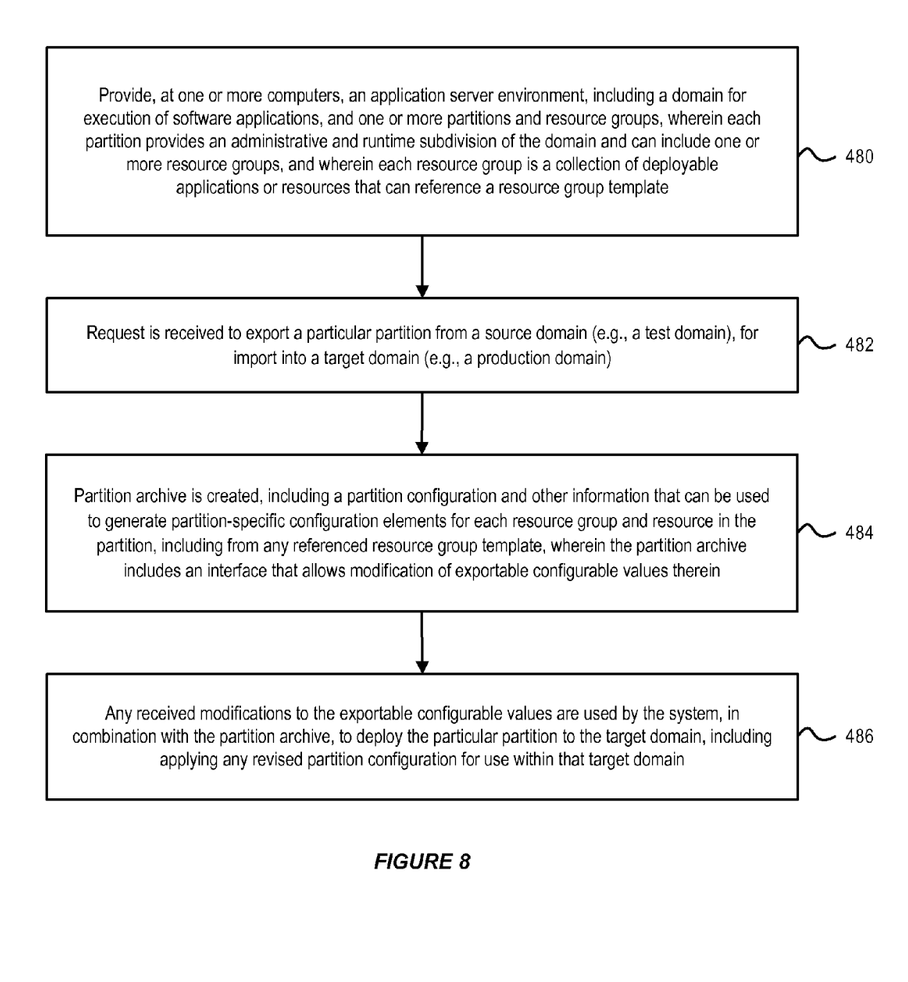
FIG. 8 illustrates a method of using portable partitions in an application server, cloud, or other environment, in accordance with an embodiment.

FIG. 8 illustrates a method of using portable partitions in an application server, cloud, or other environment, in accordance with an embodiment. As shown in FIG. 8, in accordance with an embodiment, at step 480, an application server environment is provided, including a domain for execution of software applications, and one or more partitions and resource groups, wherein each partition provides an administrative and runtime subdivision of the domain and can include one or more resource groups, and wherein each resource group is a collection of deployable applications or resources that can reference a resource group template.

At step 482, a request is received to export a particular partition from a source domain (e.g., a test domain), for import into a target domain (e.g., a production domain).

At step 484, a partition archive is created, including a partition configuration and other information that can be used to generate partition-specific configuration elements for each resource group and resource in the partition, including from any referenced resource group template, wherein the partition archive includes an interface that allows modification of exportable configurable values therein.

At step 486, any received modifications to the exportable configurable values are used by the system, in combination with the partition archive, to deploy the particular partition to the target domain, including applying any revised partition configuration for use within that target domain.

Example Implementation

Additional details describing an exemplary embodiment are provided below for purposes of illustration.

Export Partition

As described above, when a partition is exported from the source domain it produces a partition archive. In accordance with an embodiment, the following can be included in the partition archive: the partition configuration; any resource groups contained in the partition; any resource group templates referred to by those resource groups, and the contents of the partition's filesystem. As described above, optionally, the application binaries and configuration for applications deployed to the partition can also be included in the partition archive. In some instances, it is not possible to eliminate all dependencies on the domain. Some examples of configuration elements in the domain that a partition may reference include targets, and security realms.

Import Partition

In some instances, while importing a partition archive, the system administrator may need to update the dependencies on the domain (such as targets and security realms), and also optionally update other attributes in the partition configuration to make it valid. Some items that may need to be updated include partition properties, JDBCSystemResourceOverrideMBean, and other resources in the ResourceGroup.

Resource Group Template Conflicts while Importing Partition

In some instances, a partition archive may contain a resource group template that was shared with other partitions in the source domain. When importing a partition archive into the target domain it is possible that the shared resource group template may already exist in the target domain—possibly from an earlier partition import. In accordance with an embodiment, the import operation will detect if the existing resource group template is identical to the one contained in the archive by performing a deep tree comparison of both the trees (existing and new resource group template). If they are identical, then the existing resource group template will be used. Otherwise, if they are not identical, then the import will fail and require the user to retry the import indicating a new name for the resource group template that will be used to create a new resource group template, instead of using the existing resource group template.

Categories of Configuration Data

In accordance with an embodiment, there are different categories of partition configuration, each of which needs slightly different handling:

Won't change on import: these are attributes that are copied verbatim from the source domain to the target domain. If they need to change the administrator can do it later after importing the partition. Examples include WorkManager settings.

Likely to change on import: these are attributes that are very likely to change on import and will generate validation errors if they are not set for the new domain correctly. Often these are attributes that refer to config elements in the domain (outside of the partition). Examples include references to Targets and SecurityRealms.

May or may not change on import: these are attributes where we just don't know, but if they do change they should probably be changed during import (not after), because if they are wrong they may generate validation errors or bad behavior. Examples include JDBCSystemResourceOverrideMBean attributes (URL, user, passwd, etc).

Integration with Lifecycle Management

When a partition is imported into a new domain some number of external systems may need to be configured to be aware of the newly imported partition. For example, OTD may need to be configured to load balance to applications in the new partition.

Partition Archive Format

In accordance with an embodiment, the partition archive can be a zip file with the content as shown in Table 1:

TABLE 1

| Partition Archive contents | Description |
| --- | --- |
| partition-config.xml | This contains the partition configuration and resource group templates configuration from config.xml. |
| MANIFEST.MF | manifest file will include a time stamp and domain information for the archive. |
| <PartitionName>-attributes.json | This contains the MBean attributes/properties which could be potentially changed by the Administrator while importing partition. In addition to being contained in the archive a copy of this file is also placed next to the archive in the filesystem to make it easier to update and provide on import. |
| expPartSecret | This contains the encrypted secret key used for encrypting and decrypting of encrypted attributes. |
| domain/config/resource-group-templates/<resource_template_name>/* | If there is a resource group template associated with this partition then the files related to resource group template is copied here. |
| domain/config/partitions/<partition-name>/* | All the configuration files under domain/config/partitions/<partition-name>/config/* are included. |

TABLE 1-continued

| Partition Archive contents | Description |
| --- | --- |
| pfs/config/* | This contains the <partition file system>/config dir content. This would also include System Resources (JMS, JDBC, etc) descriptor files. |
| domain/upload/resource-group-templates/<resource_template_name>/<application_name>/ | Resource group template level binaries. |
| pfs/upload/<application_name>/. | Resource group level application binaries. | exportPartition

In accordance with an embodiment, the public layer which exposes exportPartition is PortablePartitionManagerMBean.

```
public ImportExportPartitionTaskMBean exportPartition(String
    partitionName, String expArchPath, Boolean includeAppsNLibs)
    throws Exception;
public ImportExportPartitionTaskMBean exportPartition(String
    partitionName, String expArchPath, Boolean includeAppsNLibs,
    String keyFile) throws Exception;
public ImportExportPartitionTaskMBean exportPartition(String
    partitionName, String expArchPath) throws Exception;
public ImportExportPartitionTaskMBean exportPartition(String
    partitionName, String expArchPath, String keyFile) throws
    Exception;
```

Where:

partitionName is the name of the partition to export.

expArchPath is a full path to the archive file to create as seen by the admin server (not the client). In addition to creating the archive exportPartition will place a copy of the <PartitionName>-attributes.json file in the same directory as the partition archive.

includeAppsNLibs is a boolean that influences how application binaries are handled. Defaults to true.

keyFile is a user provided file containing a string to use as the encryption key for encrypted attributes.

@ExportCustomizableValue Annotation

In accordance with an embodiment, by default all configuration attributes in the partition are saved in the partition archive verbatim and are imported as is (i.e., in accordance with the "Won't change" category described above). However, as described above, in some situations some attributes may need to be changed during import. In accordance with an embodiment, to indicate this, an @ExportCustomizableValue annotation can be used. If a configuration attribute has the @ExportCustomizableValue annotation then, in addition to saving the attribute to the partition archive config.xml, the attribute is also saved in the <PartitionName>-attributes.json file in the partition archive. This indicates that the value for the attribute should be prompted on import. For example:

```
@ ExportCustomizableValue
public interface JDBCSystemResourceOverrideMBean extends
ConfigurationMBean { ... }
```

In the above example, all attributes of JDBCSystemResourceOverrideMBean are copied to <PartitionName>-attributes.json along with their current values (saveDefault defaults to true).

```
public interface PartitionMBean extends ConfigurationMBean {
    . . .
    @ ExportCustomizableValue(saveDefault=false)
    RealmMBean getRealm( );
    . . .
}
```

In the above example, the realm attribute of the partition will be saved to <PartitionName>-attributes.json without a current value. An example <PartitionName>-attributes.json file can be:

```
{
    "partition" : {
        "name" : "P1",
        "jdbc-system-resource-override" : {
            "URL" : "url.com",
            "Id" : "0",
            "name" : "test123",
            "CachingDisabled" : "false",
            "Registered" : "false",
            "User" : "test123",
            "DynamicallyCreated" : "false",
            "DataSourceName" : "test-source"
        },
        "partition-properties" : [
            {
                "name" : "Property1",
                "value" : "Value1"
            },
            {
                "name" : "Property2",
                "value" : "Value2"
            }
        ]
    },
    "resource-group-template" : {
        "name" : "RGT1",
        "jdbc-system-resource" : {
            "name" : "jdbc1",
            "descriptor-file-name" : "jdbc/P1DB1-8882-jdbc.xml"
        }
        "jms-server-resource" : {
            "name" : "jms1",
            "PagingDirectory" : ""
        }
    }
}
``` importPartition

In accordance with an embodiment, the public layer which exposes importPartition is PortablePartitionManagerMBean.

```
public ImportExportPartitionTaskMBean importPartition(String
archiveFileName, boolean createNew) throws Exception;
public ImportExportPartitionTaskMBean importPartition(String
archiveFileName, boolean createNew, String keyFile) throws
Exception;
public ImportExportPartitionTaskMBean importPartition(String
archiveFileName, String partitionName, Boolean createNew) throws
Exception;
public ImportExportPartitionTaskMBean importPartition(String
archiveFileName, String partitionName, Boolean createNew,
String keyFile) throws Exception;
```

Where:
archiveFileName: full path to the archive to import as seen by the admin server (not the client), importPartition will also look for a file, <PartitionName>-attributes.json, in the same directory as the partition archive. If it is found then the values in that file will override those in the partition archive.
createNew: (see below).
partitionName: name of the newly created partition. Defaults to name specified in partition archive.
keyFile: is a user provided file containing the string that was used as the encryption key for encrypted attributes during export.
Along with recreating the partition configuration in config.xml, the applications and system resources need to be deployed for the new partition.
The administrator may provide an <PartitionName>-attributes.json file with modified attributes suitable for the target domain.
createNew Flag (importPartition)
In accordance with an embodiment, this flag has the following semantic while performing importPartition:
No Flag Specified: fail if there is an existing RGT with the same name (or with the same name that isn't the "same RGT" if the deep comparison is supported). In this case the import fails with a message like: "There already exists an RGT with the name CompanyRGT. If you want to use the CompanyRGT that already exists in the domain re-run this command with createNew=false. If you want to ignore the existing CompanyRGT and create a new CompanyRGT using the definition in the partition archive and attributes.json file, then re-run this command with createNew=true".
false: use the existing RGT if there is a clash during import.
true: create a new RGT if there is a clash.
Any existing RGT in the target domain is never modified.
Export of Application/Library Binaries
In accordance with an embodiment, when a partition is exported, whether or not application binaries are included in the partition archive is determined by the value of the "includeApps" option on the export operation. If the Boolean "includeApps" is true, the binaries are included else they are excluded.
The <partition>-attributes.json would have an entry for each application scoped to partition and resourcegroup within the partition being exported regardless of "includeApps" set to true or false. Application attributes "source-path", "plan-path", "staging-mode" are of most importance to the end user.
Import of Application/Library Binaries
In accordance with an embodiment, during importPartition how the application is deployed depends upon a number of factors, for example whether or not the application binaries are present in the <partition-name>.zip; or the staging-mode attribute in <partition-name>-attributes.json.
If the application binaries are present in the <partition-name>.zip then during importPartition, this (from the zip) application binary is used. This binary is copied over to upload directory of the application parent (be it ResourceGroupTemplate or ResourceGroup). The staging mode for the application is set to "STAGE" regardless of what the staging mode was when the partition was exported.
If the application binaries are not present in the <partition-name>.zip then during importPartition, the "staging-mode" attribute is read from <partition-name>-attribute.json file and following action taken:
If the staging-mode is "STAGE" an error message is thrown suggesting if the staging-mode is stage, the application binaries should have been included in the zip file during export
If the staging-mode is "NOSTAGE" or "EXTERNAL" then the "source-path" attribute from <partition-name>-attributes.json is read, and application deployed with "NOSTAGE" or "EXTERNAL" (whatever was read from <partition-name>-attributes.json file) as the staging-mode and source-path read. If the application binary does not exist at the read source-path and error is thrown and importPartition is stopped.

Export of Encrypted Attributes

In accordance with an embodiment, each encrypted attribute in the Domain tree can be encrypted with a key specific to the domain (kept in SerializedSystemIni.dat), which means that encrypted attributes cannot be exported as is, because key SerializedSystemIni.dat is different for each domain. Hence the following steps are used to handle export of encrypted data:

During Export generate a new Secret key.
Use the Secret key to encrypt all the encrypted attributes in partition-config.xml and any SystemResource descriptors that are part of <Partition-name>.zip.
Encrypt the Secret key with a salt and a second key and save it to the file expPartSecret that is part of the exported zip <Partition-name>.zip.

Import of Encrypted Attributes

During import after the entire partition is read and attributes changed in accordance with <Partition-name>-attributes.json, following steps are used to handle encrypted attributes:

Read the Secret key expPartSecret that is part of exported zip.
Decrypt the Secret key using a second key that is either the default key in the WLS source, or the key provided by the user using the keyFile option to import. The user provided key must match the key used on import.
Decrypt all the encrypted attributes in partition MBean (read and modified above) using the key read from expPartSecret.
Encrypt all the encrypted attributes in partition MBean with the Domain specific key (SerializedSystemIni.dat) for imported domain.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting the use of portable partitions in an application server environment, comprising:
    one or more computers, including one or more processors and an application server environment that enables deployment and execution of software applications, wherein the application server environment includes
        a domain configuration that is used at runtime to define one or more domains within the application server environment for execution of software applications, and
        one or more partitions, wherein each partition, of the one or more partitions, is associated with a partition identifier and a partition configuration, and provides an administrative and runtime subdivision of a domain and can include one or more resource groups, and
        wherein each resource group, of the one or more resource groups, is a collection of deployable applications or resources that can be defined at one of domain or partition level and optionally reference a resource group template; and
    wherein the system enables a partition to be exported from a source domain within the application server environment, and imported to a target domain within the application server environment, including wherein
        a partition archive is created which is associated with the partition in the source domain and includes a partition configuration, resource group or resource group template information, and optionally application binaries, and
        the partition archive is used to import the partition to the target domain.

2. The system of claim 1, wherein the application server environment includes a Java EE application server.

3. The system of claim 1, wherein the partition archive includes an interface that allows access to configurable values associated with the partition, for use during the import of the partition to the target domain.

4. The system of claim 3, wherein the configurable values are provided within an editable file associated with the partition archive.

5. The system of claim 3, wherein during import of the partition archive to the target domain, modified configurable values are received, which modify the configurable values associated with the partition, to provide a revised partition configuration for use in the target domain.

6. The system of claim 1, wherein during import of the partition archive to the target domain, the information in the partition archive, including exportable or configurable values associated with the partition, are used to configure the partition for use in the target domain, including any modified configurable values received either from an administrator or from another source.

7. The system of claim 1, wherein the system is provided within a cloud environment, to support multiple tenants operating within the cloud environment, including that the system can optionally associate one or more partitions with a tenant, for use by the tenant.

8. A method for supporting the use of portable partitions in an application server environment, comprising:
    providing, at one or more computers, an application server environment that enables deployment and execution of software applications, wherein the application server environment includes
 a domain configuration that is used at runtime to define one or more domains within the application server environment for execution of software applications, and
 one or more partitions, wherein each partition, of the one or more partitions, is associated with a partition identifier and a partition configuration, and provides an administrative and runtime subdivision of a domain and can include one or more resource groups, and
 wherein each resource group, of the one or more resource groups, is a collection of deployable applications or resources that can be defined at one of domain or partition level and optionally reference a resource group template; and
wherein the system enables a partition to be exported from a source domain within the application server environment, and imported to a target domain within the application server environment, including wherein
 a partition archive is created which is associated with the partition in the source domain and includes a partition configuration, resource group or resource group template information, and optionally application binaries, and
 the partition archive is used to import the partition to the target domain.

9. The method of claim 8, wherein the application server environment includes a Java EE application server.

10. The method of claim 8, wherein the partition archive includes an interface that allows access to configurable values associated with the partition, for use during the import of the partition to the target domain.

11. The method of claim 10, wherein the configurable values are provided within an editable file associated with the partition archive.

12. The method of claim 10, wherein during import of the partition archive to the target domain, modified configurable values are received, which modify the configurable values associated with the partition, to provide a revised partition configuration for use in the target domain.

13. The method of claim 8, wherein during import of the partition archive to the target domain, the information in the partition archive, including exportable or configurable values associated with the partition, are used to configure the partition for use in the target domain, including any modified configurable values received either from an administrator or from another source.

14. The method of claim 8, wherein the method is performed within a cloud environment, to support multiple tenants operating within the cloud environment, including that the system can optionally associate one or more partitions with a tenant, for use by the tenant.

15. A non-transitory computer readable storage medium, including instructions stored thereon which when read and executed by one or more computers cause the one or more computers to perform the steps comprising:

providing an application server environment that enables deployment and execution of software applications, wherein the application server environment includes
 a domain configuration that is used at runtime to define one or more domains within the application server environment for execution of software applications, and
 one or more partitions, wherein each partition, of the one or more partitions, is associated with a partition identifier and a partition configuration, and provides an administrative and runtime subdivision of a domain and can include one or more resource groups, and
 wherein each resource group, of the one or more resource groups, is a collection of deployable applications or resources that can be defined at one of domain or partition level and optionally reference a resource group template; and
 wherein the system enables a partition to be exported from a source domain within the application server environment, and imported to a target domain within the application server environment, including wherein
 a partition archive is created which is associated with the partition in the source domain and includes a partition configuration, resource group or resource group template information, and optionally application binaries, and
 the partition archive is used to import the partition to the target domain.

16. The non-transitory computer readable storage medium of claim 15, wherein the application server environment includes a Java EE application server.

17. The non-transitory computer readable storage medium of claim 15, wherein the partition archive includes an interface that allows access to configurable values associated with the partition, for use during the import of the partition to the target domain.

18. The non-transitory computer readable storage medium of claim 17, wherein during import of the partition archive to the target domain, modified configurable values are received, which modify the configurable values associated with the partition, to provide a revised partition configuration for use in the target domain.

19. The non-transitory computer readable storage medium of claim 15, wherein during import of the partition archive to the target domain, the information in the partition archive, including exportable or configurable values associated with the partition, are used to configure the partition for use in the target domain, including any modified configurable values received either from an administrator or from another source.

20. The non-transitory computer readable storage medium of claim 15, wherein the method is performed within a cloud environment, to support multiple tenants operating within the cloud environment, including that the system can optionally associate one or more partitions with a tenant, for use by the tenant.

* * * * *

UNITED STATES PATENT AND TRADEMARK OFFICE
CERTIFICATE OF CORRECTION

PATENT NO. : 10,038,645 B2
APPLICATION NO. : 14/748102
DATED : July 31, 2018
INVENTOR(S) : Patel et al.

It is certified that error appears in the above-identified patent and that said Letters Patent is hereby corrected as shown below:

On the Title Page

In Column 1, under Inventors, Line 2, delete "Dipol" and insert -- Di Pol --, therefor.

In the Specification

In Column 11, Line 30, delete "passwd," and insert -- password, --, therefor.

In Column 13, Line 63, delete "client)," and insert -- client). --, therefor.

In Column 14, Line 62, delete "export" and insert -- export. --, therefor.

In Column 15, Line 7, delete "SerializedSystemlni.dat)," and insert -- SerializedSystemini.dat), --, therefor.

In Column 15, Line 9, delete "SerializedSystemlni.dat" and insert -- SerializedSystemini.dat --, therefor.

In Column 15, Line 34, delete "(SerializedSystemlni.dat)" and insert -- (SerializedSystemini.dat) --, therefor.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*